UNITED STATES PATENT OFFICE.

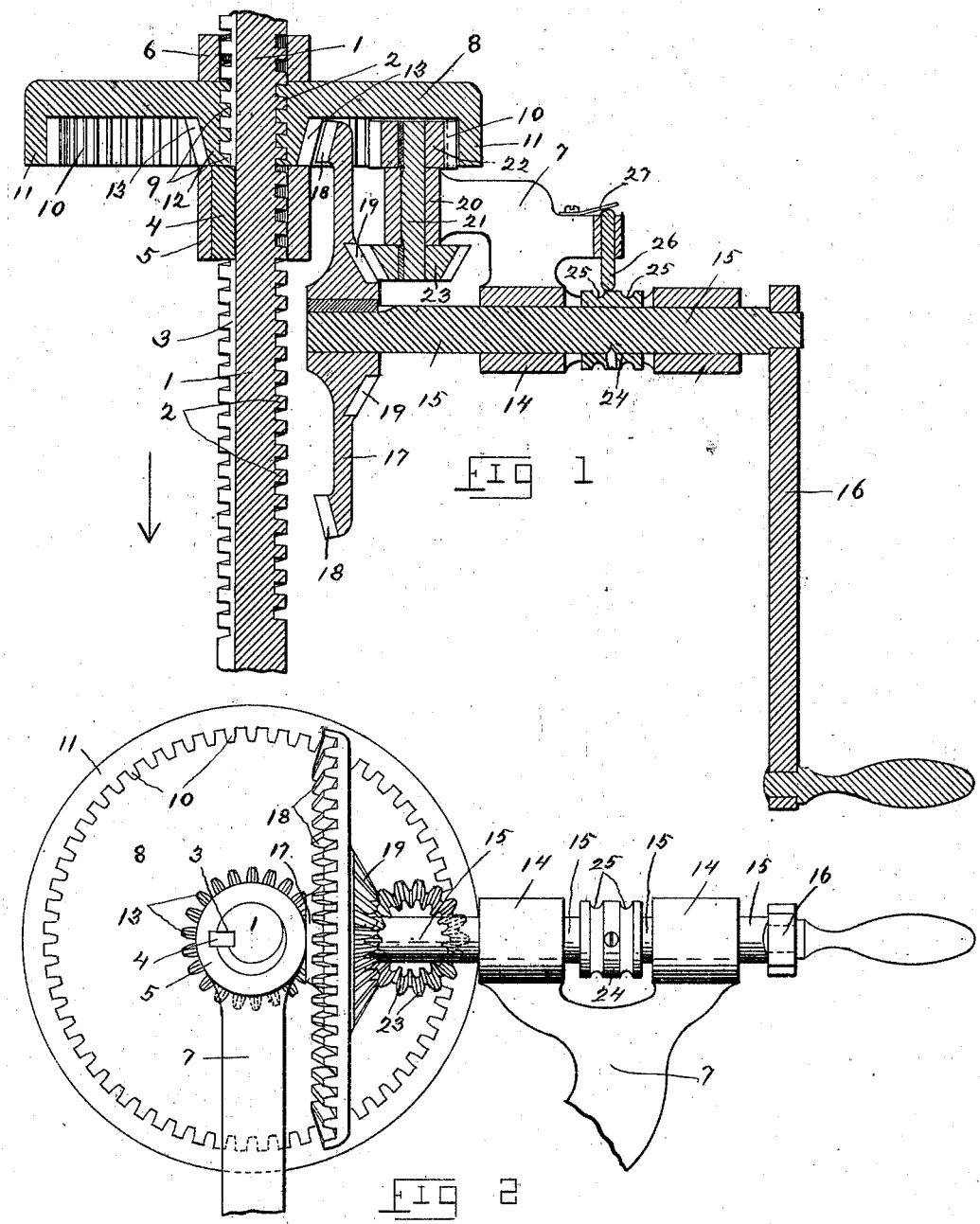

FRANK D. ZIMMERMAN, OF SCHOENECK, PENNSYLVANIA.

MECHANICAL MOVEMENT.

967,699.  Specification of Letters Patent.  Patented Aug. 16, 1910.

Application filed November 16, 1909. Serial No. 528,345.

*To all whom it may concern:*

Be it known that I, FRANK D. ZIMMERMAN, a citizen of the United States, residing at Schoeneck, in the county of Lancaster and State of Pennsylvania, have invented certain new and useful Improvements in Mechanical Movements, of which the following is a specification, reference being had therein to the accompanying drawing.

My invention relates to a mechanical movement or gearing of that class known as a quick return movement, such as are employed in sausage stuffers, grinders, drills and presses, where it is desired to reciprocate a rod, and where the downward movement of the rod is comparatively slow and the upward movement much faster, and where the driving shaft or crank always revolves in the same direction, and the return or upward movement of the rod is accomplished by the use of shift gears.

The objects of the invention are to produce a mechanical movement or gearing of this class, that has few parts, possesses great leverage and power for the working stroke and a quick return for the idle stroke, without reversing the direction of revolution of the operating crank.

With these and other objects in view my device consists in certain construction and combination of parts as will be hereinafter fully described and claimed in this specification and illustrated in the accompanying drawings, which form a part of this application and in which like figures of reference refer to corresponding parts in all of the views; but it is fully understood that I do not confine myself to the exact design as shown, as slight changes may be made in the construction and arrangement of the several parts within the scope of the claims without departing from the spirit of the invention.

In the accompanying drawings, I have simply indicated bearing brackets for the various parts, as my novel form of gearing may be mounted in any suitable frame as will be required for different uses.

In the drawings:—Figure 1, is a vertical sectional view, taken through the center. Fig. 2, is a bottom plan view.

Referring to the drawings, 1, indicates the reciprocating rod, which is formed with the thread 2, and is splined 3, as shown in Fig. 1, to receive the feather 4, which is secured in the bearing 5, of the frame 7, to restrain said rod 1, from rotating therein, but allowing it to be reciprocated through said bearing 5, and the bearing 6, which is also in the frame 7; said bearings 5, and 6, also serving to prevent any lateral movement of the combination gear 8, which is provided with the thread 9, and which is mounted on the rod 1; and by its revolutions it raises or lowers said rod 1, according to the direction of its revolution. Said rod 1, may be attached at either end to suitable mechanism, but is here indicated in the drawings as having its working stroke in the direction of the arrow, namely, downward. The combination gear 8, is formed with the internal gear teeth 10, upon its flanged periphery 11, and upon its hub 12, with the bevel gear teeth 13, and upon the same side thereof. At right angles to said rod 1, and slidably and rotatably mounted in the bearings 14, of the main frame 7, is a driving shaft 15, which is here shown as being operated by the crank 16, but which may be operated by any suitable power. Upon the inner end of said shaft 15, is rigidly secured the combination bevel gear 17, which is provided with the teeth 18, which are adapted to mesh with and drive the bevel teeth 13, on the gear 8; and upon its other side is formed the bevel gear 19, of much smaller diameter. Mounted in the vertical bearing 20, which is formed in the frame 7, and which is parallel to the rod 1, is rotatably mounted a shaft 21, upon the upper end of which is secured a pinion 22, which is in mesh with and rotates the internal gear 10; and upon its lower end is secured a bevel gear 23, which is designed to mesh with and be rotated by the bevel gear 19. Upon the shaft 15, and between the bearings 14, is secured a collar 24, which is formed with the encircling grooves 25, in the periphery thereof; while above said collar 24, in the frame 7, is mounted a retaining pin or catch 26, which is actuated by the spring 27, in such a manner that its lower end rides upon said collar, and it will engage and ride in either of the grooves 25, and yet the shaft may be shifted in or out, and the catch pin 26, will snap into either groove and retain the shaft in either position until it is desired to shift it.

The operation of the device is as follows:—To move the reciprocating rod downward, the driving shaft is pulled outward until the gears 23, and 19, are brought into engagement and are retained thereby by the pin 26, engaging the inner groove 25, when by the rotation of the shaft 15, the shaft 21, will be rotated, thus rotating the combination gear 8, in a proper direction to force the rod downward, the leverage being the greatest and the speed slow. As soon as it is desired to raise the rod, the shaft 15, is forced inward, thus disengaging the gears 23, and 19, and engaging the gears 18, and 13, and changing the direction of rotation of the combination gear 8, and raising the rod rapidly as the driving gear is the larger. The catch pin 26, now engages the outer groove 25, and the gears 10, and 22, run idle.

Having thus described my invention what I claim as new and desire to secure by Letters Patent is:—

1. In a device of the class described, in combination with a reciprocating rod, having screw-threads formed thereon, said rod slidably and non-rotatably mounted, of a combination gear rotatably mounted in said frame and formed with a screw-threaded hub engaging said rod, said combination gear formed with a bevel gear face upon the hub thereof, and with an internal spur gear face formed upon the flange thereof, a driving shaft rotatably and slidably mounted in said frame at right angles to said rod, a vertical shaft rotatably mounted in said frame between said driving shaft and said combination gear, a pinion secured upon the upper end of said vertical shaft and in mesh with said internal spur gear, a bevel gear secured upon the lower end of said vertical shaft, a shift gear formed with bevel gears upon both sides thereof, one of said bevel gears being designed to engage with and drive the bevel gear formed on the combination gear, and the other bevel gear designed to engage with and drive the bevel gear secured upon the vertical shaft, means for changing the position of said driving shaft so that said shift gear may be brought into engagement with either set of gears, to drive the combination gear.

2. In a device of the class described, in combination with a frame a driving shaft slidably mounted within the frame, of means for limiting the lateral movement of said driving shaft, comprising a collar rigidly secured upon said shaft and formed with encircling grooves in the periphery thereof, a spring-actuated catch-pin mounted in said frame and adapted to engage either of said grooves for the purpose of retaining said driving shaft in either of its extreme positions, a shift gear formed with bevel teeth upon its opposite sides, a combination flanged gear formed with bevel teeth upon its hub and internal spur gear teeth upon its flange, and mounted in said frame at right angles to said driving shaft and adapted to be rotated in one direction by said shift gear, an idler shaft mounted in said frame, gears carried by said idler shaft for the purpose of transmitting motion from said shift gear to rotate said combination gear in the opposite direction and a rod screw-threaded within said combination gear and adapted to be reciprocated by the rotation thereof.

3. In a quick return gearing of the class described, in combination with a driving shaft and a reciprocating rod mounted at right angles to said driving shaft, of a combined bevel and internal spur gear screw-threaded upon said rod and restrained from lateral movement, a shaft mounted parallel to said rod, a pinion on one end of said shaft in mesh with said internal gear, a bevel gear secured upon the other end of said shaft, and a shift gear mounted adjacent thereto and adapted to be thrown in or out of engagement therewith.

In testimony whereof I affix my signature in presence of two witnesses.

FRANK D. ZIMMERMAN.

Witnesses:
J. R. SHIRK,
W. E. CROUSE.